(12) United States Patent
Park

(10) Patent No.: US 11,987,773 B2
(45) Date of Patent: May 21, 2024

(54) BEVERAGE MAKER AND METHOD FOR CONTROLLING BEVERAGE MAKER

(71) Applicant: LG ELECTRONICS INC., Seoul (KR)

(72) Inventor: Sunyoung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1155 days.

(21) Appl. No.: 16/747,905

(22) Filed: Jan. 21, 2020

(65) Prior Publication Data

US 2020/0239817 A1    Jul. 30, 2020

(30) Foreign Application Priority Data

Jan. 25, 2019   (KR) .................. 10-2019-0009881

(51) Int. Cl.
| | | |
|---|---|---|
| *C12C 11/00* | (2006.01) | |
| *B67C 3/00* | (2006.01) | |
| *C12C 13/10* | (2006.01) | |

(52) U.S. Cl.
CPC ............ *C12C 11/006* (2013.01); *B67C 3/007* (2013.01); *C12C 13/10* (2013.01)

(58) Field of Classification Search
CPC ....... B67C 3/007; C12C 11/00; C12C 11/006; C12C 11/07; C12C 13/00; C12C 13/02; C12C 13/08; C12C 13/10

See application file for complete search history.

(56) References Cited

U.S. PATENT DOCUMENTS

2018/0016531 A1* 1/2018 Park .................. C12C 13/10

FOREIGN PATENT DOCUMENTS

| CN | 107632120 A | * | 1/2018 |
|---|---|---|---|
| JP | 07-023764 | | 1/1995 |
| KR | 10-2018-0052359 | | 5/2018 |
| KR | 10-2018-0065551 | | 6/2018 |

OTHER PUBLICATIONS

Korean Office Action dated Aug. 21, 2020.

* cited by examiner

*Primary Examiner* — Hung D Nguyen

(74) *Attorney, Agent, or Firm* — KED & ASSOCIATES

(57) ABSTRACT

A beverage maker and a method for controlling a beverage maker are provided. The beverage maker may include a fermentation tank forming a space in which a beverage is made, a gas discharge channel connected to the fermentation tank, a gas discharge valve disposed in the gas discharge channel, a flow sensor disposed in the gas discharge channel, and a controller configured to control a primary fermentation operation of the beverage to be made. The controller may be configured to perform the primary fermentation operation by opening the gas discharge valve, when completion of the primary fermentation operation is confirmed, acquire information on an amount of carbon dioxide discharged via the gas discharge channel while the primary fermentation operation is performed, and perform a bottling inducing operation for bottling of the beverage into an external container, based on the amount of discharged carbon dioxide.

20 Claims, 8 Drawing Sheets ical Property Office, the disclosure of which is incorporated herein by reference.

BACKGROUND

1. Field

A beverage maker and a method for controlling a beverage maker are disclosed herein.

2. Background

Beverages are collectively referred to as drinkable liquids, such as alcohol or tea. For example, beverages may be divided into various categories, such as water (a beverage) for quenching thirst, juice beverages with a unique flavor and taste, refreshing beverages giving a refreshing sensation, favorite beverages with a stimulant effect, or alcoholic beverages with an alcohol effect.

A representative example of such a beverage is beer. Beer is an alcoholic beverage produced by making juice of malt, which is made by sprouting barley, filtering the juice, adding hop, and fermenting yeast.

Consumers may purchase ready-made products made and sold by a beer maker or may make beer at home (hereinafter "homemade" beer) produced by directly fermenting beer ingredients at home or in a bar. Homemade beer may be made in a variety of types rather than ready-made products and may be made to better suit a consumer's taste.

The ingredients for making beer may include water, liquid malt, hop, yeast, and a flavoring additive, for example. Leaven, which is called yeast, may be added to liquid malt to ferment the liquid malt and assist production of alcohol and carbonic acid. Flavor additives are additives that enhance the taste of beer, such as fruit, syrup, and vanilla beans, for example.

Generally, homemade beer may include three stages or operations, namely, a wort stage or operation, a fermentation stage or operation, and an aging stage of operation, and it may take about two to three weeks from the wort stage or operation to the aging stage or operation. Maintaining an optimum temperature during the fermentation operation is important for homemade beer, and the easier the beer is to make, the more user convenience is improved. Recently, a beverage maker capable of easily making a beer-like beverage at home or in a bar has been gradually used, and such a beverage maker is configured to be convenient.

BRIEF DESCRIPTION OF THE DRAWINGS

Embodiments will be described in detail with reference to the following drawings in which like reference numerals refer to like elements, and wherein.

DETAILED DESCRIPTION

Figure 1:
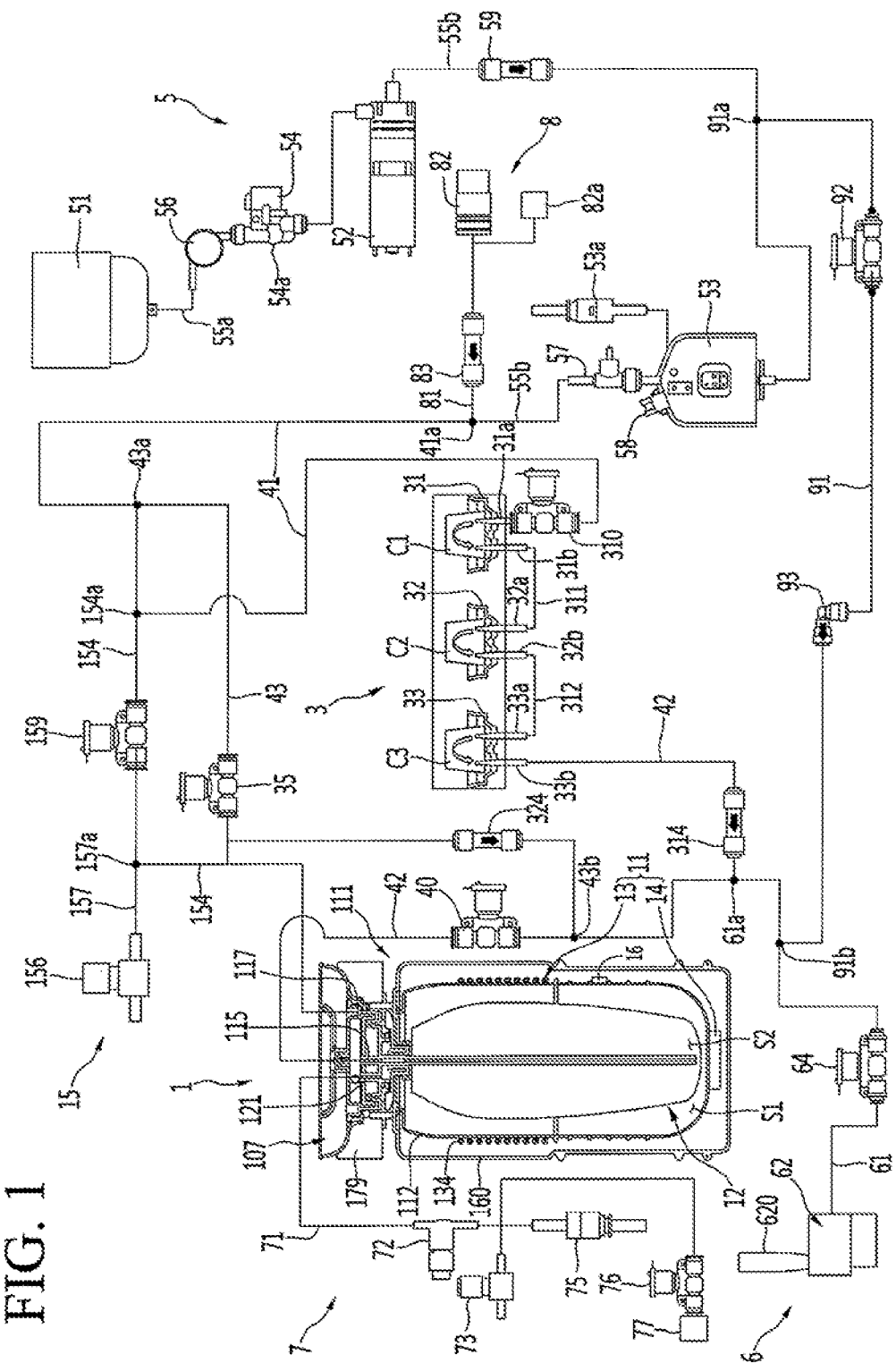
FIG. 1 is a schematic view of a beverage maker according to an embodiment.

Hereinafter, embodiments are described with reference to drawings. Wherever possible, like or the same reference numerals have been used to indicate like or the same elements, and repetitive disclosure has been omitted.

Although beer is exemplified as a beverage that is made using a beverage maker according to embodiments, the kind of beverage that can be made using the beverage maker is not limited to beer and various kinds of beverages may be made using the beverage maker according to embodiments.

FIG. 1 is a schematic view of a beverage maker according to an embodiment. The beverage maker may include a fermentation module 1. A beverage may be fermented in the fermentation module 1. The beverage maker may include a temperature controller that controls an inner temperature of the fermentation module 1.

The beverage maker may include a fluid supply module 5. The fluid supply module 5 may supply a fluid, such as water.

The beverage maker may include an ingredient supplier 3 provided with ingredient receivers 31, 32, and 33 in which ingredients required for making a beverage may be accommodated. The beverage maker may include main channels 41 and 42 that connect the fluid supply module 5 to the fermentation module 1.

The beverage maker may include a beverage dispenser 6 that dispenses the beverage made in the fermentation module 1 to the outside. The beverage dispenser 6 may be connected to second main channel 42. Thus, the beverage dispensed from the fermentation module 1 may be guided to the beverage dispenser 6 by passing through a portion of the second main channel 42.

The beverage maker may further include a gas discharger 7. The gas discharger 7 may be connected to the fermentation module 1 to discharge a gas generated while the beverage is made.

The beverage maker may further include an air injector 8 that injects air. The air injector 8 may be connected to the fluid supply module 5 or first main channel 41. The air injector 8 may include an air pump 82.

The beverage maker may further include an air controller 15 that controls a pressure between an inner wall of a fermentation tank 112 and an outer surface of a fermentation container 12. The beverage maker may further include a sub channel 91. The sub channel 91 may connect the fluid supply module 5 to the beverage dispenser 6.

The fermentation module 1 may include a fermentation tank module 111 having an opening, and a fermentation lid 107 that opens and closes the opening. The fermentation tank module 111 may include a fermentation case 160 and fermentation tank 112 accommodated in the fermentation case 160 and having an inner space S1. Insulation (not shown) may be provided between the fermentation case 160 and the fermentation tank 112. The fermentation tank module 111 may further include a lid seating body 179 on which the fermentation lid 107 may be seated.

Each of the fermentation case 160 and the fermentation tank 112 may be provided as an assembly of a plurality of members or components. The fermentation case 160 may define an outer appearance of the fermentation tank module 111.

The fermentation lid 107 may seal an inside of the fermentation tank module 111 and be disposed on the fermentation tank module 111 to cover the opening. A main channel, more particularly, a main channel connecting portion 115 connected to the second main channel 42 may be provided in the fermentation lid 107.

A fermentation container 12 may be accommodated in the fermentation tank 112. The fermentation container 12 may be provided as a separate container so that beverage ingredients and a finished beverage do not stain the inner wall of the fermentation tank 112. The fermentation container 12 may be separably disposed on or in the fermentation tank 112. The fermentation container 12 may be seated on or in the fermentation tank 112 to ferment the beverage within the fermentation tank 112. After the fermentation container 12 is used, the fermentation container 12 may be removed from the fermentation tank 112.

The fermentation container 12 may be a pack containing ingredients for making a beverage. The fermentation container 12 may be made of a flexible material. Thus, the fermentation container 12 may be easily inserted into the fermentation tank 112 and be contracted and expanded by a pressure. However, embodiments are not limited thereto. For example, the fermentation container 12 may be made of a PET material.

The fermentation container 12 may have a beverage-making space S2 in which beverage ingredients may be accommodated, and the beverage made. The fermentation container 12 may have a size less than a size of inner space S1 of the fermentation tank 112.

The fermentation container 12 may be inserted into and accommodated in the fermentation tank 112 in a state in which the ingredients are contained in the fermentation container 12. The fermentation container 12 may be inserted into the fermentation tank 112 and then accommodated in the fermentation tank 112 in a state in which the fermentation lid 107 is opened.

The fermentation lid 107 may seal the fermentation tank 112 after the fermentation container 12 is inserted into the fermentation tank 112. The fermentation container 12 may assist fermentation of the ingredients in a state in which the fermentation container 12 is accommodated in the inner space S1 sealed by the fermentation container 112 and the fermentation lid 107. The fermentation container 12 may be expanded by pressure therein during the making of the beverage. The fermentation container 12 may be pressed by air within the fermentation tank 112 when the beverage contained in the fermentation container 12 is dispensed, and the air may be supplied between the inner surface of the fermentation tank 112 and the fermentation container 12.

The fermentation tank 112 may be disposed in the fermentation case 160. The fermentation tank 112 may have an outer circumferential surface and an outer bottom surface, which may be spaced apart from an inner surface of the fermentation case 160. The outer circumferential surface of the fermentation tank 112 may be spaced apart from an inner circumference of the fermentation case 160, and the outer bottom surface of the fermentation tank 112 may be spaced apart from an inner bottom surface of the fermentation case 160.

The insulation (not shown) may be provided between the fermentation case 160 and the fermentation tank 112. The insulation may be disposed in the fermentation case 160 to surround the fermentation tank 112. Thus, a temperature of the fermentation tank 112 may be maintained constant. The insulation may be made of a material, such as foamed polystyrene or polyurethane, which has a high thermal insulating performance and absorbs vibration.

The fermentation tank 112 may include a temperature sensor 16 that measures a temperature of the fermentation tank 112. The temperature sensor 16 may be mounted on the outer circumferential surface of the fermentation tank 112. The temperature sensor 16 may be disposed below an evaporator 134 wound around the fermentation tank 112.

A temperature controller 11 may change an inner temperature of the fermentation tank module 111. The temperature controller 11 may change a temperature of the fermentation tank 112. The temperature controller 11 may heat or cool the fermentation tank 112 to control a temperature of the fermentation tank 112 at an optimal temperature for fermenting the beverage.

The temperature controller 11 may include at least one of a refrigerant cycle device 13 and/or a heater 14. However, embodiments are not limited thereto. For example, the temperature controller 11 may include a thermoelement (TEM).

The refrigerant cycle device 13 may control the temperature of the fermentation tank 112 to cool a temperature of the fermentation tank 112. The refrigerant cycle device 13 may include a compressor, a condenser, an expansion mechanism, and the evaporator 134.

The evaporator 134 may contact the outer circumferential surface of the fermentation tank 112. The evaporator 134 may be provided as an evaporation tube wound around the outer circumferential surface of the fermentation tank 112. The evaporator 134 may be accommodated between the fermentation tank 112 and the insulation to cool the fermentation tank 112 insulated by the insulation.

The temperature controller 11 may further include heater 14 that heats the fermentation tank 112. The heater 14 may contact the outer bottom surface of the fermentation tank 112. The heater 14 may be provided as a heat generation heater that generates heat when power is applied. The heater 14 may be provided as a plate heater. Thus, natural convection of a fluid may be generated inside of the fermentation tank 112 by the evaporator 134 and the heater 14, and temperature distribution inside of the fermentation tank 112 and the fermentation container 12 may be uniform.

As described above, the main channels 41 and 42 may include first main channel 41 that connects the fluid supply module 5 to the ingredient supplier 3 and second main channel 42 that connects the ingredient supplier 3 to the fermentation module 1. That is, the first main channel 41 may guide a fluid, such as water supplied from the fluid supply module 5 to the ingredient supplier 3, and the second main channel 42 may guide a mixture of ingredients and the fluid, which are extracted from the ingredient supplier 3, to the fermentation module 1.

The first main channel 41 may have a first end 41a connected to the fluid supply module 5 and a second end connected to the ingredient supplier 3, more particularly, an inlet 31a of an initial ingredient receiver 31, which will be described hereinafter.

An ingredient supply valve 310 that opens and closes the first main channel 41 may be installed in the first main channel 41. The ingredient supply valve 310 may be provided in the ingredient supplier 3.

The ingredient supply valve 310 may be opened when additives accommodated in the ingredient receivers 31, 32, and 33 are input to open the first main channel 41. The ingredient supply valve 310 may also be opened when the ingredient receivers 31, 32, and 33 are cleaned to open the first main channel 41.

The second main channel 42 may have a first end connected to the main channel connecting portion 115 of the fermentation module 1 and a second end connected to the ingredient supplier 3, more particularly, an outlet 33b of a final ingredient receiver 33, which will be described hereinafter.

A main valve 40 that opens and closes the second main channel 42 may be installed in the second main channel 42. Also, a main check valve 314 that allows fluid to flow from the ingredient supplier 3 to the fermentation module 1 may be installed in the second main channel 42. That is, the main check valve 314 may prevent the fluid from flowing back to the ingredient supplier 3. The main check valve 314 may be disposed between the main valve 40 and the ingredient supplier 3 with respect to the second main channel 42.

The main valve 40 may be opened to open the second main channel 42 when fluid is supplied to the fermentation container 12. The main valve 40 may be closed to close the second main channel 42 while the fermentation tank 112 is cooled. The main valve 40 may be opened to open the second main channel 42 when air is injected into the fermentation container 12. The main valve 40 may be opened to open the second main channel 42 when ingredients are supplied into the fermentation container 1. The main valve 40 may be closed to seal the inside of the fermentation container 12 during fermentation of the ingredients. The main valve 40 may be closed to seal the inside of the fermentation container 12 when the beverage is aged and stored. The main valve 40 may be opened to open the second main channel 42 when the beverage is dispensed by the beverage dispenser 6. The beverage within the fermentation container 1 may pass through the main valve 40 to flow to the beverage dispenser 6.

The main channels 41 and 42 may be provided as one continuous channel when the beverage maker does not include the ingredient supplier 3. When the beverage maker includes the ingredient supplier 3, the beverage maker may further include bypass channel 43 configured to allow fluid or air to bypass the ingredient receivers 31 and 32.

The bypass channel 43 may bypass the ingredient receivers 31, 32, and 33 and then be connected to the first main channel 41 and the second main channel 42. The bypass channel 43 may have a first end 43a connected to the first main channel 41 and a second end 43b connected to the second main channel 42. The first end 43a of the bypass channel 43 may be connected to the first main channel 41 between the fluid supply module 5 and the ingredient supply valve 310 and the second end 43b may be connected to the second main channel 42 between the main valve 40 and the ingredient supplier 3.

A bypass valve 35 that opens and closes the bypass channel 43 may be installed in the bypass channel 43. The bypass valve 35 may be opened to open the bypass channel 43 when fluid supplied from the fluid supply module 5 is supplied to the fermentation container 12. The bypass valve 35 may be opened to open the bypass channel 43 when air injected from the air injector 8 is supplied to the fermentation container 12. The bypass valve 35 may be opened to open the bypass channel 43 when the bypass channel 43 is cleaned.

A bypass check valve 324 that allows fluid to flow from the first main channel 41 to the second main channel 42 may be installed in the bypass channel 43. That is, the fluid may flow only from the first main channel 41 to the second main channel 42, but may not flow in the opposite direction. The bypass check valve 324 may be disposed between the bypass valve 35 and the second main channel 42 with respect to the bypass channel 43.

When beer is made using the beverage maker, ingredients for making the beer may include water, malt, yeast, hop, and flavoring additives, for example. The beverage maker may include all of the ingredient supplier 3 and the fermentation container 12. The ingredients for making the beverage may be accommodated separately in the ingredient supplier 3 and the fermentation container 12. That is, a portion of the ingredients for making the beverage may be accommodated in the fermentation container 12, and the remaining ingredients may be accommodated in the ingredient supplier 3. The remaining ingredients accommodated in the ingredient supplier 3 may be supplied to the fermentation container 12 together with the fluid supplied from the fluid supply module 5 and mixed with the portion of the ingredients accommodated in the fermentation container 12.

A main ingredient that is essential for making a beverage may be accommodated in the fermentation container 12, and the other ingredients or additives added to the main ingredient may be accommodated in the ingredient supplier 3. In this case, the additives accommodated in the ingredient supplier 3 may be mixed with fluid supplied from the fluid supply module 5 and supplied to the fermentation container 12 and then mixed with the main ingredient accommodated in the fermentation container 12.

An amount of the main ingredient accommodated in the fermentation container 12 may be greater than an amount of other ingredients. For example, when beer is made, the main material may be malt of malt, yeast, hop, and flavoring additives. Also, the additive accommodated in the ingredient supplier 3 may be the other ingredients except for the malt of the ingredients for making beer, for example, yeast, hop, and flavoring additives.

According to one embodiment, beverage maker may not include the ingredient supplier 3 but may include the fermentation container 12. In this case, the main ingredient may be accommodated in the fermentation container 12, and the user may directly put the additives into the fermentation container 12.

If the beverage maker includes both the ingredient supplier 3 and the fermentation container 12, the beverage may be more easily made. Hereinafter, a case in which the beverage maker includes both the ingredient supplier 3 and the fermentation container 12, will be described as an example. However, embodiments are not limited to the case in which the beverage maker includes both the ingredient supplier 3 and the fermentation container 12.

The ingredients within the fermentation container 12 may be fermented over time, and the beverage made in the fermentation container 12 may flow to the second main channel 42 through the main channel connecting portion 115 and also flow from the second main channel 42 to the beverage dispenser 6 to be dispensed.

The ingredients that are necessary for making the beverage may be accommodated in the ingredient supplier 3, and the fluid supplied from the fluid supply module 5 may pass through ingredient supplier 3. For example, when the beverage made in the beverage maker is beer, the ingredients accommodated in the ingredient supplier 3 may be yeast, hop, and flavoring additives, for example.

The ingredients accommodated in the ingredient supplier 3 may be directly accommodated into the ingredient receivers 31, 32, and 33 provided in the ingredient supplier 3. At least one ingredient receiver 31, 32, and 33 may be provided in the ingredient supplier 3. Also, a plurality of ingredient receivers 31, 32, and 33 may be provided in the ingredient supplier 3. The plurality of ingredient receivers 31, 32, and 33 may be partitioned with respect to each other.

Inlets 31a, 32a, and 33a, through which the fluid may be introduced, and outlets 31b, 32b, and 33b, through which the fluid may be discharged, may be provided in the ingredient receivers 31, 32, and 33, respectively. The fluid introduced into the inlet of one ingredient receiver may be mixed with the ingredients within the ingredient receivers and then discharged through the outlet.

The ingredients accommodated in the ingredient supplier 3 may be accommodated in ingredient containers C1, C2, and C3. The ingredient containers C1, C2, and C3 may be accommodated in the ingredient receivers 31, 32, and 33, and each of the ingredient receivers 31, 32, and 33 may be referred to as an ingredient container mount. The ingredient containers C1, C2, and C3 may be a capsule, or a pod, for example; however, embodiments are not limited thereto.

When the ingredients are accommodated in the ingredient containers C1, C2, and C3, the ingredient supplier 3 may be configured so that the ingredient containers C1, C2, and C3 may be seated therein and withdrawn therefrom. The ingredient supplier 3 may be provided as an ingredient container kit assembly in which the ingredient containers C1, C2, and C3 are separably accommodated.

For example, a first additive, a second additive, and a third additive may be accommodated in the ingredient supplier 3. The first additive may be yeast, the second additive may be hop, and the third additive may be a flavoring additive. The ingredient supplier 3 may include a first ingredient container mount 31 in which a first ingredient container C1 containing the first additive may be accommodated, a second ingredient container mount 32 in which a second ingredient container C2 containing the second additive may be accommodated, and a third ingredient container mount 33 in which a third ingredient container C3 containing the third additive may be accommodated.

The ingredients contained in the ingredient receivers or the ingredient containers C1, C2, and C3 may be extracted by a fluid pressure of fluid supplied from the fluid supply module 5. When the ingredients are extracted by the fluid pressure, the fluid supplied from the fluid supply module 5 to the first main channel 41 may pass through the ingredient receivers or the ingredient containers C1, C2, and C3 and then may be mixed with the ingredients, and the ingredients accommodated in the ingredient receivers or the ingredient containers C1, C2, and C3 may flow to the second main channel together with the fluid.

A plurality of different additives may be accommodated separately in the ingredient supplier 3. For example, when beer is made, the plurality of additives accommodated in the ingredient supplier 3 may be yeast, hop, and a flavoring additive, which may be accommodated separated from each other.

When the plurality of ingredient receivers is provided in the ingredient supplier 3, the plurality of ingredient receivers 31, 32, and 33 may be connected in series to each other in a flow direction of the fluid. That is, the ingredient supplier 3 may include at least one connecting channel 311 and 312 that connects the outlet of one ingredient receiver of the plurality of ingredient receivers 31, 32, and 33 to the inlet of another ingredient receiver.

Also, the plurality of ingredient receivers 31, 32, and 33 may include an initial ingredient receiver 31 and a final ingredient receiver 33. The plurality of ingredient receivers 31, 32, and 33 may further include an intermediate ingredient receiver 32.

The inlet 31a of the initial ingredient receiver 31 may be connected to the first main channel 41, and the outlet 33b of the final ingredient receiver 33 may be connected to the second main channel 42. The intermediate ingredient receiver 32 may be disposed between the first ingredient receiver 31 and the second ingredient receiver 33 in the flow direction of the fluid. The inlet 32a and the outlet 32b of the intermediate ingredient receiver 32 may be connected to different connecting channels 311 and 312 from each other.

As illustrated in FIG. 1, when three ingredient receivers are provided in the ingredient supplier 3, the outlet 31b of the initial ingredient receiver 31 may be connected to the inlet 32a of the intermediate ingredient receiver 32 through the first connecting channel 311, and the outlet 32b of the intermediate ingredient receiver 32 may be connected to the inlet 33a of the final ingredient receiver 33 through the second connecting channel 312. The fluid introduced into the inlet 31a of the final ingredient receiver 31 through the first main channel 41 may flow to the first connecting channel 311 through the outlet 31b together with the first additive accommodated in the initial ingredient receiver 31.

The fluid, which may be a mixture of water and a first additive, introduced into the inlet 32a of the intermediate ingredient receiver 32 through the first main channel 311 may flow to the second connecting channel 312 through the outlet 32b together with the second additive accommodated in the intermediate ingredient receiver 32. The fluid, which may now be a mixture of water and first and second additives, introduced into the inlet 33a of the final ingredient receiver 33 through the second main channel 312 may flow to the second connecting channel 42 through the outlet 33b together with a third additive accommodated in the final ingredient receiver 33. The fluid, which may now be a mixture of water and first, second, and third additives, discharged through the second main channel 42 may be guided to the main channel connecting portion 115 of the fermentation module 1 and then introduced into the fermentation container 12.

However, the configuration of the ingredient supplier is not limited thereto. For example, when the intermediate ingredient receiver is not provided, two ingredient receivers may be provided in the ingredient supplier 3. In this case, one ingredient receiver may be the initial ingredient receiver, and the other ingredient receiver may be the final ingredient receiver. The outlet of the initial ingredient receiver and the inlet of the final ingredient receiver may be connected to each other by the connecting channel.

For another example, when a plurality of the intermediate ingredient receiver is provided, four or more ingredient receivers may be provided in the ingredient supplier 3. In this case, one ingredient receiver may be the initial ingredient receiver, another ingredient receiver may be the final ingredient receiver, and the remaining ingredient receiver may be the intermediate ingredient receiver. In this case, as the connection between the ingredient receivers in series is easily understood by a person skilled in the art, detailed descriptions thereof have been omitted.

As the plurality of ingredient receivers 31, 32, and 33 may be connected in series to each other, the channel configuration of the ingredient supplier 3 may be simplified. Further, as the additives contained in the ingredient containers C1, C2, and C3 may be extracted all at once, a time taken to extract the additives may decrease. Furthermore, as the user does not have to worry about a mounting order of the ingredient containers C1, C2, and C3, malfunction due to the mounting of the ingredient containers C1, C2, and C3 in an erroneous order may not occur. Also, fluid leakage in the ingredient supplier 3 may be minimized to improve reliability.

When the ingredients accommodated in the ingredient supplier 3 are accommodated in the ingredient containers C1, C2, and C3, the initial ingredient receiver 31 may be referred to as "an initial ingredient container mount", the intermediate ingredient receiver 32 may be referred to as an "intermediate ingredient container mount", and the final ingredient receiver 33 may be referred to as a "final ingredient container mount".

The fluid supply module 5 may include a tank 51, a pump 52 that pumps a fluid, such as water within the tank 51, and a heater 53 that heats the fluid pumped by the pump 52. The tank 51 and the pump 52 may be connected to a tank discharge channel 55a, and the fluid contained in the tank 51 may be introduced into the pump 52 through the tank discharge channel 55a.

The pump 52 and a first end of the first main channel 41 may be connected to a supply channel 55b, and the fluid discharged from the pump 52 may be guided to the first main channel 41 through the supply channel 55b. A flow meter 56 that measures a flow rate of the fluid discharged from the tank 51 may be installed in the tank discharge channel 55a.

A flow rate control valve 54 that controls a flow rate of the fluid discharged from the tank 51 may be installed in the tank discharge channel 55a. The flow rate control valve 54 may include an operation-in motor.

A thermistor 54a that measures a temperature of the fluid discharged from the tank 51 may be installed in the tank discharge channel 55a. The thermistor 54a may be built into the flow rate control valve 54.

A check valve 59 that prevents the fluid from flowing back to the pump 52 may be installed in the supply channel 55b. Also, the heater 53 may be installed in the supply channel 55b. A thermal fuse 58 that interrupts a circuit to cutoff current applied to the heater 53 when a temperature is high may be installed in the heater 53.

The fluid supply module 5 may further include a safety valve 53a. The safety valve 53a may communicate with an inside of a heater case of the heater 53. The safety valve 53a may restrict a maximum inner pressure of the heater case. For example, the safety valve 53a may restrict the maximum inner pressure of the heater case to a pressure of about 3.0 bar.

The fluid supply module 5 may further include a temperature sensor 57 that measures a temperature of the fluid passing through the heater 53. The temperature sensor 57 may be installed in the heater 53. Alternatively, the temperature sensor 57 may be disposed at a portion of the supply channel 55b behind the heater 53 in the flow direction of fluid. Also, the temperature sensor 57 may be installed in the first main channel 41.

When the pump 52 is driven, the fluid within the tank 51 may be introduced into the pump 52 through the tank discharge channel 55a, and the fluid discharged from the pump 52 may be heated in the heater 53 while flowing through the supply channel 55b and then be guided to the first main channel 41.

The beverage dispenser 6 may be connected to the second main channel 42. The beverage dispenser 6 may include the dispenser 62 that dispenses a finished beverage and the beverage dispensing channel 61 that connects to the dispenser 62 to the second main channel 42.

The beverage dispensing channel 61 may have a first end 61a connected between the main check valve 314 and the main valve 40 with respect to the second main channel 42 and a second end connected to the dispenser 62. A beverage dispensing valve 64 that opens and closes the beverage dispensing channel 61 may be installed in the beverage dispensing channel 61.

The beverage dispensing valve 64 may be opened to open the beverage dispensing channel 61 when the beverage is dispensed. The beverage dispensing valve 64 may be opened to open the beverage dispensing channel 61 when residual fluid is removed. The beverage dispensing valve 64 may be opened to open the beverage dispensing channel 61 when the beverage dispenser is cleaned.

An anti-foaming portion (not shown) may be provided in the beverage dispensing channel 61, and an amount of foam of the beverage flowing from the second main passage 42 to the beverage dispensing channel 61 may be minimized while passing through the anti-foaming portion. A mesh that filters the foam may be provided in the anti-foaming portion (not shown).

When the beverage is dispensed, the beverage dispensing valve 64 may be opened. When the beverage is not dispensed, the beverage dispensing valve 64 may be maintained in a closed state.

The gas discharger 7 may be connected to the fermentation module 1 to discharge gas generated in the fermentation container 12. The gas discharger 7 may include a gas discharge channel 71 connected to the fermentation module 1, a gas pressure sensor 72 installed in the gas discharge channel 71, and a gas discharge valve 73 connected upstream of the gas pressure sensor 72 in the gas discharge channel 71 in a gas discharge direction.

The gas discharge channel 71 may be connected to the fermentation module 1, more particularly, the fermentation lid 107. A gas discharge channel connecting portion 121 to which the gas discharge channel 71 may be connected may be provided in the fermentation lid 107.

The gas within the fermentation container 12 may flow into the gas discharge channel 71 and the gas pressure sensor 72 through the gas discharge channel connecting portion 121. The gas pressure sensor 72 may detect a pressure of the gas discharged to the gas discharge channel 71 through the gas discharge channel connecting portion 121 within the fermentation container 12.

The gas discharge valve 73 may be opened when the air is injected into the fermentation container 12 by the air injector 8. The beverage maker may uniformly mix the malt with the fluid by injecting air into the fermentation container 12. Foam generated in the liquid malt may be discharged from an upper portion of the fermentation container 12 to the outside through the gas discharge channel 71 and the gas discharge valve 73. The gas discharge valve 73 may be opened during the fermentation operation and then closed.

The gas discharger 7 may further include a safety valve 75 connected to the gas discharge channel 71. The safety valve 75 may be connected upstream of the gas pressure sensor 71 in the gas discharge channel 71 in the gas discharge direction. The safety valve 75 may restrict a maximum pressure of the fermentation container 12 and the gas discharge channel 71. For example, the safety valve 75 may restrict the maximum pressure of the fermentation container 12 and the gas discharge channel 71 to a pressure of about 3.0 bar.

The gas discharger 7 may further include a pressure release valve 76. The pressure release valve 76 may be connected to the gas discharge channel 71. The pressure release valve 76 and the gas discharge valve 73 may be selectively opened/closed. The gas discharge channel 71 may be branched to be respectively connected to the gas discharge valve 73 and the pressure release valve 76.

A noise reducing device 77 may be mounted on the pressure release valve 76. The noise reducing device 77 may include at least one of an orifice structure or a muffler structure, for example.

Even though the pressure release valve 76 is opened, an inner pressure of the fermentation container 12 may gradually decrease due to the noise reducing device 77. When fermentation of the beverage progresses, the pressure release valve 76 may be opened to release the pressure in a state in which the inner pressure of the fermentation container 12 increases. The noise reducing device 77 may effectively reduce noise generated due to a difference in pressure between the inside and outside of the fermentation container 12. The pressure release valve 76 may be open/close-controlled in a fermentation operation with relatively high internal pressure.

The air injector 8 may be connected to the supply channel 55b or the first main channel 41 to inject air. Hereinafter, for convenience of description, a case in which the air injector 8 is connected to the supply channel 55b will be described as an example.

The air injector 8 may be connected to an opposite side of a sub channel 91, which will be described hereinafter, with respect to the heater 53. The air injected by the air injector 8 may pass through the heater 53 to flow to the sub channel 91 together with residual fluid within the heater 53. Thus, the residual fluid within the heater 53 may be removed to maintain a clean state of the heater 53.

Alternatively, air injected from the air injector 8 to the first main channel 41 may successively pass through the bypass channel 43 and the second main channel 42 and then be injected into the fermentation container 12. Thus, stirring or aeration may be performed in the fermentation container 12.

Alternatively, air injected from the air injector 8 to the first main channel 41 may be guided to the ingredient supplier 3 to flow to the ingredient container mounts 31, 32, and 33. Residual fluid or residue within the ingredient containers C1, C2, and C3 or the ingredient container mounts 31, 32, and 33 may flow to the second main channel 42 due to air injected by the air injector 8. The ingredient containers C1, C2, and C3 and the ingredient container mounts 31, 32, and 33 may be cleanly maintained by the air injected by the air injector 8.

The air injector 8 may include an air injection channel 81 connected to the supply channel 55b or the first main channel 41 and an air pump 82 connected to the air injection channel 81. The air pump 82 may pump air to the air injection channel 81. An air injection check valve 83 that prevents fluid flowing to the supply channel 55b by the pump 52 from being introduced into the air pump 82 through the air injection channel 81 may be installed in the air injection channel 81.

The air injector 8 may further include an air filter 82a. The air filter 82a may be provided in a suction portion of the air pump 82, and thus, external air may be suctioned into the air pump 82 by passing through the air filter 82a. Thus, the air pump 82 may inject clean air into the air injection channel 81.

The air controller 15 may control a pressure between the inner wall of the fermentation tank 112 and the outer surface of the fermentation container 12. The air controller 15 may supply air into a space between the fermentation container 12 and the fermentation tank 112. On the other hand, the air controller 15 may exhaust the air within the space between the fermentation container 12 and the fermentation tank 112 to the outside.

The air controller 15 may include an air supply channel 154 connected to the fermentation module 1, and an exhaust channel 157 connected to the air supply channel 154 to exhaust the air to the outside. The air supply channel 154 may have a first end connected to the first main channel 41 and a second end connected to the fermentation module 1.

The air supply channel 154 may be connected to the fermentation module 1, more particularly, the fermentation lid 107. An air supply channel connecting portion 117 to which the air supply channel 154 may be connected may be provided in the fermentation module 1. The air supply channel connecting portion 117 may communicate with the space between the inner wall of the fermentation tank 112 and the outer surface of the fermentation container 12.

The air injected from the air injector 8 to the first main channel 41 may be guided between the outer surface of the fermentation container 12 and the inner wall of the fermentation tank 112 through the air supply channel 154. The air injector 8 may function as an air supplier that supplies air into the space between the fermentation container 12 and the fermentation tank 112 together with the air supply channel 154.

As described above, the air supplied into the fermentation tank 112 may press the fermentation container 12 between the outer surface of the fermentation container 12 and the inner wall of the fermentation tank 112. The beverage within the fermentation container 12 may be pressed by the fermentation container 12 pressed by the air. When the main valve 40 and the beverage dispensing valve 64 are opened, the beverage may pass through the main channel connecting portion 115 to flow to the second main channel 42. The beverage flowing from the fermentation container 12 to the second main channel 42 may be dispensed to the outside through the beverage dispenser 6.

The air pump 82 may supply air so that a predetermined pressure occurs between the fermentation container 12 and the fermentation tank 112. Thus, a pressure at which the beverage within the fermentation container 12 is easily dispensed may occur between the fermentation container 12 and the fermentation tank 112.

The air pump 82 may be maintained in an off state while the beverage is dispensed. When the beverage is completely dispensed, the air pump 82 may be driven for a next beverage dispensing and then stopped.

Thus, when the beverage is finished, the beverage maker may dispense the beverage within the fermentation container 12 to the beverage dispenser 6 in a state in which the fermentation container 1 is disposed within the fermentation module 1 without withdrawing the fermentation container 12 to the outside of the fermentation module 1.

The air controller 15 may include a separate air supply pump with respect to the air injector 8. In this case, the air supply channel 154 may be connected to the air supply pump, but may not be connected to the first main channel 41. However, the injection of air into the fermentation container 12 by the air pump 82 and the supplying of air into the space between the fermentation container 12 and the fermentation tank 112 may be combined with each other to realize a compact product and reduce manufacturing costs.

The exhaust channel 157 may function as an air exhaust passage, through which the air between the fermentation container 12 and the fermentation tank 112 may be exhausted to the outside, together with a portion of the air supply channel 154. The exhaust channel 157 may be disposed outside of the fermentation module 1. The exhaust channel 157 may be connected to a portion of the air supply channel 154, which is disposed outside of the fermentation tank 112.

The air supply channel 154 may include a first channel connected between a connecting portion 157a connected to the first main channel 41 and the exhaust channel 157 and a second channel connected between the connecting portion 154a connected to the exhaust channel 157 and the air supply channel connecting portion 117. The first channel may be an air supply channel that guides the air pumped by the air pump 82 to the second channel. Also, the second channel may be an air supply and exhaust-combined channel that supplies the air passing through the air supply channel into the space between the fermentation tank 112 and the fermentation container 12 or guides the air discharged from the space between the fermentation tank 112 and the fermentation container 12 the connecting channel 157.

The exhaust channel 157 may be connected to the exhaust valve 156 that opens and closes the exhaust channel 157. The exhaust valve 156 may be opened so that the air between the fermentation container 12 and the fermentation tank 112 may be exhausted to the outside when the fermentation container 12 is expanded while the beverage is made. The exhaust valve 156 may be opened when the fluid is supplied by the fluid supply module 5. The exhaust valve 156 may be opened when the air is injected by the air injector 8.

The exhaust valve 156 may be opened so that the air between the fermentation container 12 and the fermentation tank 112 is exhausted when the beverage within the fermentation container 12 is completely dispensed. The user may take the fermentation container 12 out of the fermentation tank 112 when the beverage is completely dispensed. This is done because safety accidents occur when the inside of the fermentation tank 112 is maintained at a high pressure. The exhaust valve 156 may be opened when the beverage within the fermentation container 12 is completely dispensed.

The air controller 15 may further include an air supply valve 159 that restricts the air pumped by the air pump 82 and supplied between the fermentation container 12 and the fermentation tank 112. The air supply valve 159 may be installed in the air supply channel 154. That is, the air supply valve 159 may be installed between the connecting portion 154a of the first main channel 41 and the connecting portion 157a of the exhaust channel 157 in the air supply channel 154.

The sub channel 91 may connect the fluid supply module 5 to the beverage dispenser 6. That is, the sub channel 91 may have a first end 91a connected to the supply channel 55b and a second end 91b connected to the beverage dispensing channel 61.

The sub channel 91 may be connected between the pump 52 and the heater 53 with respect to the supply channel 55b. Also, the sub channel 91 may be connected to the connecting portion 61a of the second main channel 42 and the beverage dispensing valve 64 with respect to the beverage dispensing channel 61.

The fluid supplied by the pump 52 and the air pumped by the air pump 82 may be guided to the beverage dispensing channel 61 through the sub channel 91 and then may be dispensed to the dispenser 62. Thus, residual fluid or beverage remaining in the beverage dispenser 6 may be removed.

A sub valve 92 that opens and closes the sub channel 91 may be installed in the sub channel 91. The sub valve 92 may be opened to open the sub channel 91 when the beverage is dispensed, or cleaning is performed.

A sub check valve 93 that prevents the beverage in the beverage dispensing channel 61 from flowing back to the fluid supply module 5 may be installed in the sub channel 91. The sub check valve 93 may be disposed between the sub valve 92 and the beverage dispensing channel 61 with respect to the sub channel 91.

The sub channel 91 may function as a residual fluid removing channel of the fluid supply module 5. For example, when the air pump 82 is turned on in a state in which the air supply valve 159, the bypass valve 35, and the ingredient supply valve 310 are closed, the sub valve 92 is opened, and the air injected into the air injection channel 81 may pass through the heater 53 to flow to the sub channel 91. Then, the air may pass through the sub valve 92 to flow to the beverage dispensing channel 61 and then be dispensed to the dispenser 62. In this process, the air may be dispensed together with fluid from the fluid supply module 5, more particularly, the residual fluid remaining in the heater 53 and the supply channel 55b so that residual fluid may be removed.

The sub channel 91 may function as a cleaning channel. That is, a beverage may be partially dispensed by the dispenser 62, and when a long period of time has elapsed before a next beverage dispensing, fluid may flow to the sub channel 91 to clean the dispenser 62 before the next beverage dispensing is performed.

Figure 2:
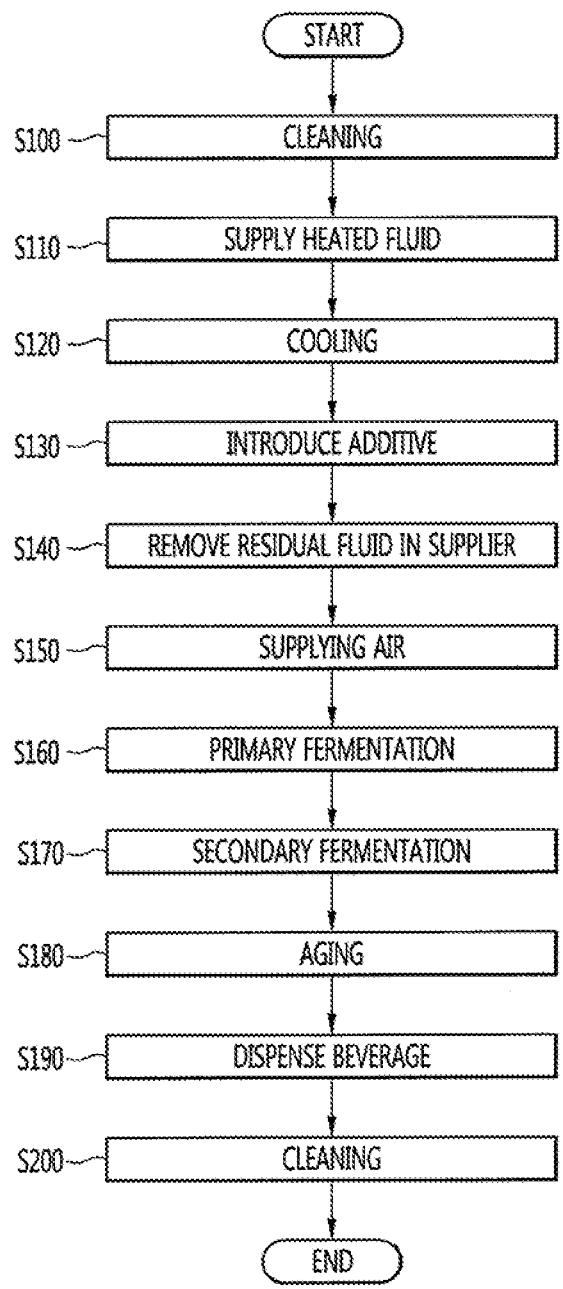
FIG. 2 is a flowchart of a method for controlling a beverage maker according to an embodiment.

FIG. 2 is a flowchart of a method for controlling a beverage maker according to an embodiment.

The beverage maker according to this embodiment may include cleaning operations (S100 and S200) for cleaning the channels. The cleaning operations (S100 and S200) may be separately performed with respect to a beverage making operation.

The cleaning operations (S100 and S200) may be performed before and/or after the beverage making operation. Also, the cleaning operations (S100 and S200) may be performed by a user input during the beverage making operation. In this case, like a primary fermentation operation (S160) or a secondary fermentation operation (S170), which will be described hereinafter, the cleaning operations (S100 and S200) may be performed while the channel connected to the fermentation module 1 is closed, and the ingredients are not contained in the ingredient suppler 3.

The cleaning operations (S100 and S200) may be performed in a state in which the ingredient containers are accommodated in the ingredient supplier 3, and the fermentation container 12 is accommodated in the fermentation module 1. The user may input a cleaning command through input unit 420 (referring to FIG. 3), a remote controller, or a portable terminal, for example. The controller 450 may control the beverage maker to perform the cleaning operations (S100 and S200) according to the input of the cleaning command.

Also, the user may input a beverage making command through the input unit 420, a remote controller, or a portable terminal, for example. The controller 450 may control the beverage maker to perform the cleaning operations (S100 and S200) before and/or after the beverage making operation according to the input of the beverage making operation.

The controller 450 may supply a fluid, such as water of the tank 51 to the inner channels and the ingredient supplier 3 in the cleaning operation. The supplied water may be discharged to the outside through the dispenser 62 together with foreign matter or residue present in the channels and the ingredient supplier 3.

In the beverage maker, the cleaning operation may be performed for a predetermined cleaning time. After the predetermined cleaning time, the cleaning operation may be completed. Also, the beverage making operation of making a beverage may be performed in the beverage maker according to this embodiment.

The user may seat the fermentation container 12 on the fermentation module 1 for the beverage making operation. In this case, some (for example, malt) of ingredients may be received in the fermentation container 12. The malt may be received in the form of malt oil, for example.

The user may insert the plurality of ingredient containers C1, C2, and C3 into the ingredient supplier 3 before or after the fermentation container 12 is seated. The user may input the beverage making command through the input unit 420, the remote controller, or the mobile terminal, for example. The controller 450 may control the beverage maker to perform the beverage making operation according to the input of the beverage making command.

The beverage making operation may include a fluid supply operation (S110). The fluid supply operation (S110) may be a liquid malt formation operation of mixing malt in the fermentation container 12 with heated fluid to form liquid malt.

The controller 450 may turn on the pump 52 to introduce the fluid from the tank 51 into the fermentation container 12, in the fluid supply operation (S110). According to an embodiment, to introduce heated fluid into the fermentation container 12, the fluid supply module 5 may further include a heater 53. In this case, the fluid discharged from the tank 51 may pass through the pump 52, may flow to the heater 53, and may be heated by the heater 53. Fluid heated by the heater 53 may be introduced into the fermentation container 12 through a channel between the fluid supply module 5 and the fermentation module 1. The heated fluid introduced into the fermentation container 12 may be mixed with the malt contained in the fermentation container 12, and the malt in the fermentation container 12 may be mixed with fluid and gradually diluted. The malt within the fermentation container 12 may be mixed with the fluid and gradually diluted. As the heated fluid is supplied to the fermentation container 12, the malt accommodated in the fermentation container 12 may be quickly uniformly mixed with the heated fluid.

The controller 450 may perform the fluid supply operation (S110) until an amount of accumulated fluid detected by the flow meter 56 reaches a predetermined flow rate, and when the amount of accumulated fluid detected by the flow meter 56 reaches the predetermined flow rate, the fluid supply operation (S110) may be completed. When the fluid supply operation (S110) is completed, the controller 450 may turn off the pump 52 and the heater 53.

The beverage making operation may include a fermentation tank cooling operation (S120). When the fluid supply operation (S110) is completed, the fermentation tank cooling operation (S120) for cooling the fermentation tank 112 or the fermentation container 12 may be performed.

The controller 450 may control the temperature controller 11 to cool the fermentation container 12. The controller 450 may control the refrigerant cycle device 13 to cool the fermentation container 12. When the refrigerant cycle device 13 is driven, the fermentation container 12 may be gradually cooled, and also, the liquid malt accommodated in the fermentation container 12 may be cooled. The controller 450 may control the refrigerant cycle device 13 according to the temperature detected by the temperature sensor 16 installed in the fermentation module 1.

The beverage making operation may include an additive introducing operation (S130). The beverage maker may perform the additive introducing operation (S130) while performing the cooling operation (S120). For example, the beverage maker may perform the additive introducing operation (S130), when the temperature sensed by the temperature sensor 16 reaches a specific temperature value higher than the cooling temperature set for the cooling operation (S120).

In the additive introducing operation (S130), the ingredients received in the ingredient supplier 3 may be introduced into the fermentation container 12. The controller 450 may turn on the pump 52. When the pump 52 is turned on, the fluid in the tank 51 may be introduced into the ingredient supplier 3 by passing through the pump 52 and a channel between the fluid supply module 5 and the ingredient supplier 3. Fluid introduced into the ingredient supplier 3 may be mixed with the ingredient contained in the ingredient supplier 3 and introduced into the fermentation container 12 together with the ingredient.

The controller 450 may complete the additive introducing operation (S130) when the accumulated flow rate detected by the flow meter 56 reaches the additive introduction predetermined flow rate from the start of the additive introducing operation (S130). When the additive introducing operation (S130) is completed, the controller 450 may turn off the pump 52.

The beverage making operation may include an ingredient supplier residual fluid removing operation (S140). When the additive introducing operation (S130) is completed, the ingredient supplier residual fluid removing operation (S140) of removing residual fluid from the ingredient supplier 3 may be performed.

In the ingredient supplier residual fluid removing operation (S140), the controller 450 may turn on the air pump 82. When the air pump 82 is turned on, air may be introduced into the ingredient supplier 3 through a channel between the air pump 82 and the ingredient supplier 3. The air introduced into the ingredient supplier 3 may blow and push the residual fluid in the ingredient supplier 3 into a channel between the ingredient supplier 3 and the fermentation module 1. The air flowing into the channel may be introduced into the fermentation container 12 together with the residual fluid. Accordingly, the ingredients and the fluid, which are not extracted, but remain in the ingredient supplier 3, may be entirely introduced into the fermentation container 12.

The controller 450 may turn on the air pump 82 for a predetermined residual fluid removal time and may complete the ingredient supplier residual fluid removing operation (S140) after the predetermined residual fluid removal time has elapsed. When the ingredient supplier residual fluid removing operation (S140) is completed, the controller 450 may turn off the air pump 82.

The beverage making operation may include an air supplying operation (S150). The beverage maker may complete the cooling operation (S120) when the temperature sensed by the temperature sensor 16 is equal to or less than a cooling temperature at least one time after the cooling operation (S120) is commenced and the refrigerant cycle device 13 is turned on. The beverage maker may perform the air supplying operation (S150) of supplying air into the fermentation container 12 to mix a liquid malt, after the cooling operation (S120) is completed.

In the air supplying operation (S150), the controller 450 may turn on the air pump 82. While the air pump 82 is in an ON state, the air may be introduced into the fermentation container 12 by passing through the channel between the air pump 82 and the fermentation module 1. The air introduced into the fermentation container 12 as described above may collide with the liquid malt to help the malt be more uniformly mixed with heated fluid. In addition, the air colliding with the liquid malt may supply oxygen to the liquid malt. In other words, stirring and aeration may be performed.

The controller 450 may turn on the air pump 82 and may mix the air with the liquid malt for a predetermined mixing time, and may complete the air supplying operation (S150) when the mixing predetermined time has elapsed after the air pump 82 is turned on. In the air supplying operation (S150), the controller 450 may turn off the air pump 82.

The beverage making operation may include a fermentation operation (S160 and S170). The fermentation operation may include primary fermentation operation (S160) and secondary fermentation operation (S170). The controller 450 may control temperature controller 11 such that the temperature measured by temperature sensor 16 is maintained at a primary fermentation target temperature in the primary fermentation operation.

The controller 450 may periodically open or close the gas discharge valve 73 that opens or closes a channel between the fermentation container 12 and the outside, and may store a pressure sensed by the gas pressure sensor 72 in memory 450 while the gas discharge valve 73 is closed. The controller 450 may complete the primary fermentation operation (S160), when a variation in the pressure periodically sensed by the gas pressure sensor exceeds a primary fermentation reference pressure variation.

The controller 450 may commence the secondary fermentation operation (S170) after the primary fermentation operation (S160) is completed. The controller 450 may control the temperature controller 11 such that the temperature measured by the temperature sensor 16 becomes a secondary primary fermentation target temperature in the secondary fermentation operation (S170). The secondary fermentation target temperature may be equal to the first fermentation target temperature; however, embodiments are not limited thereto.

The controller 450 may open and close the gas discharge valve 73 based on the inner pressure of the fermentation tank 112 after the secondary fermentation operation (S170) has commenced. When the variation in the pressure sensed by the gas pressure sensor 72 exceeds a secondary fermentation pressure variation, or when the secondary fermentation progress time exceeds the predetermined secondary fermentation time, the controller 450 may determine that the secondary fermentation is completed and may complete the secondary fermentation operation (S170).

Alternatively, the controller 450 may open and close the gas discharge valve 73 such that the inner pressure of the fermentation tank 112 is maintained within a secondary fermentation pressure range for the predetermined secondary fermentation time. The controller 450 may complete the secondary fermentation operation (S170) when the predetermined secondary fermentation time has elapsed.

The beverage making operation may include an aging operation (S180). When the primary fermentation operation (S160) and the secondary fermentation operation (S170) are completed, the aging operation (S180) may be performed.

The controller 450 may stand by for an aging time in the aging operation (S180), and may control the beverage temperature controller such that the temperature of the beverage is maintained between an upper limit and a lower limit of a predetermined aging temperature for the aging time.

When the aging time has elapsed, the beverage is finished. However, if necessary, the aging operation (S180) may be omitted and the beverage making completed when the secondary fermentation operation (S170) is completed.

Figure 3:
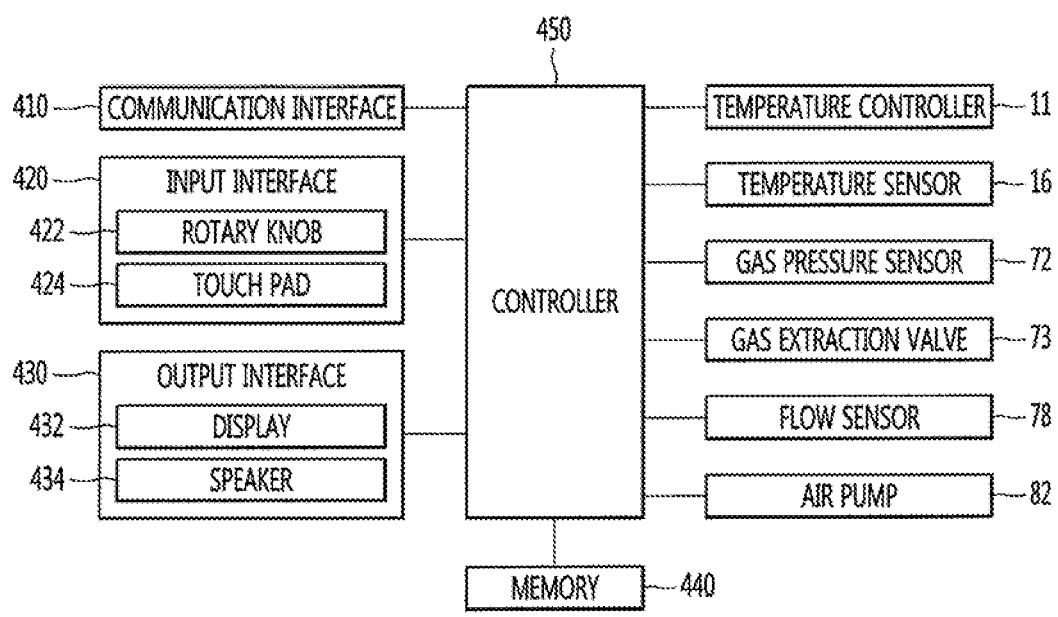
FIG. 3 is a schematic block diagram illustrating components for controlling a beverage maker according to an embodiment.

The controller 450 may display that beverage making is finished, through the display 440 (see FIG. 3). The controller 450 may maintain the temperature of the fermentation container 12 between an upper limit and a lower limit of a predetermined drinking temperature until a beverage dispensing operation (S190) described hereinafter is completed.

According to an embodiment, the beverage maker may further perform the beverage dispensing operation (S190) of dispensing a beverage after the beverage is completely made. In the beverage dispensing operation (S190), the user may dispense a beverage by handling the dispenser 62. When the user opens the dispenser 62, the beverage in the fermentation container 12 may be dispensed through the dispenser 62 after passing through the channel between the fermentation module 1 and the dispenser 62.

The user may dispense the beverage at least once through the dispenser 62. In other words, the beverage dispensing operation may be performed at least once, and the controller 450 may determine whether the beverage dispensing is completed by using information, such as the time during which the dispenser 62 is opened.

When the controller 450 determines that all of the beverage in the fermentation container 12 has been dispensed, and thus, the beverage dispensing is complete, the controller 450 may further perform a cleaning operation (S200) after the beverage making operation and the beverage dispensing operation. The cleaning operation (S200) may be similar to the cleaning operation (S100) before the beverage making operation.

Hereinafter, a configuration and operation of the beverage maker according to an embodiment will be described with reference to FIGS. 3 to 10.

FIG. 3 is a schematic block diagram illustrating components for controlling a beverage maker according to an embodiment. The components for controlling the beverage maker, which is illustrated in FIG. 3, are not essential components to realize the beverage maker. Accordingly, the beverage maker according to embodiments may include a larger or smaller number of components.

Referring to FIG. 3, the beverage maker may include a communication interface 410 to communicate with a terminal, such as a smart phone, or a tablet PC, for example, or a server, for example. For example, the controller 450 may receive a request for performing a function for making a beverage from a terminal of the user or recipe information through the communication interface 410. In addition, the controller 450 may transmit various pieces of information, such as an operation of the beverage maker, a beverage making state, and/or a storage state of the beverage, for example, to the terminal or the server through the communication interface 410.

The communication interface 410 may include a module to support at least one of various wireless/wired communication schemes which are well known. For example, the communication interface 410 may include a short-range wireless communication module, such as Bluetooth or Near Field Communication (NFC), or a wireless Internet module, such as a wireless local area network (WLAN) module, for example. For example, a NFC module may obtain recipe information corresponding to a beverage preparation pack or a beverage preparation kit from a NFC tag as the NFC tag included in the beverage preparation pack or the beverage preparation kit approaches within a predetermined distance.

The input interface 420 may receive various requests or commands from a user. For example, the input interface 420 may include a rotary knob 422, a touch pad 424 (or a touch screen), other buttons, or a microphone. The controller 450 may receive a request for execution of a beverage making operation, recipe information, and control commands for various operations of other beverage makers through the input interface 420, for example.

An output interface 430 may output various kinds of information related to an operation or state of the beverage maker and various kinds of information related to a beverage being made or stored in the beverage maker, for example. For example, the output interface 430 may include at least one of a display 432 for outputting various types of information in a visual form, such as a graphic or text, or a speaker 434 for outputting the various types of information in an audio form, such as voice or sound.

The display 432 may be implemented using a liquid crystal display (LCD), a light emitting diode (LED), and/or an organic light emitting diode (OLED) display, for example. Although the following description will be made on the assumption that the display 432 is realized in a cylindrical form, the form of the display 432 may be variously modified.

The memory 440 may store various pieces of information or data associated with operation of the beverage maker, for example. For example, the memory 440 may store recipe information for beverages that may be made or various program data for operation of the beverage maker. In addition, the memory 440 may store various graphic data associated with screens displayed through the display 432.

The memory 440 according to embodiments may store information on a total amount of carbon dioxide generated according to a type of introduced ingredients, for example, a type of wort and yeast, and an amount (weight) of fermented beverage. Further, the memory 440 may store information on an amount (volume) of fermented beverage, and an amount (weight) of carbon dioxide dissolved according to a target amount (volume) of carbonic acid of the made beverage. Furthermore, the memory 440 may store an algorithm or program data for measuring (calculating) the amount (volume) of discharged carbon dioxide based on information on the flow rate detected by a flow sensor 78 when carbon dioxide is discharged via the gas discharge channel 71 after primary fermentation is completed.

The controller 450 may control an overall operation of the beverage maker. In this case, the controller 450 may refer to at least one controller. The at least one controller may be implemented in hardware, such as a CPU, an application processor, a microcomputer (or a microcomputer), an integrated circuit, and/or an application specific integrated circuit (ASIC), for example.

The controller 450 may control the temperature controller 11 based on the temperature sensed by the temperature sensor 16 to adjust the temperature of the fermentation tank 112 to the predetermined temperature in the cooling operation (S120) or the fermentation operations (S160 and S170). As described above, the temperature controller 11 may include the refrigerant cycle device 13 to cool the fermentation tank 112 and the heater 14 to heat the fermentation tank 112.

The controller 450 may control the gas pressure sensor 72 to measure the inner pressure of the fermentation tank 112 in the fermentation operation (S160 and S170). In addition, the controller 450 may control the gas discharge valve 73 to adjust the inner pressure of the fermentation tank 112 or discharge gas including off-flavor generated during fermentation to the outside, in the fermentation operations (S160 and S170).

When a secondary fermentation operation and aging operation of a beverage are set to be performed outside by bottling a beverage into an external container after competition of the primary fermentation operation (S160), the controller 450 may measure the amount of discharged carbon dioxide from the flow rate detected via the flow sensor 78 while further performing fermentation after completion of the primary fermentation operation (S160). The controller 450 may induce the user to bottle the beverage when the measured discharge amount reaches (exceeds) a predetermined discharge amount. The predetermined discharge amount may correspond to a difference between the total amount of generated carbon dioxide and the amount of dissolved carbon dioxide.

Hereinafter, an operation of the beverage maker according to an embodiment will be described with reference to FIGS. 4 to 10.

Figure 4:
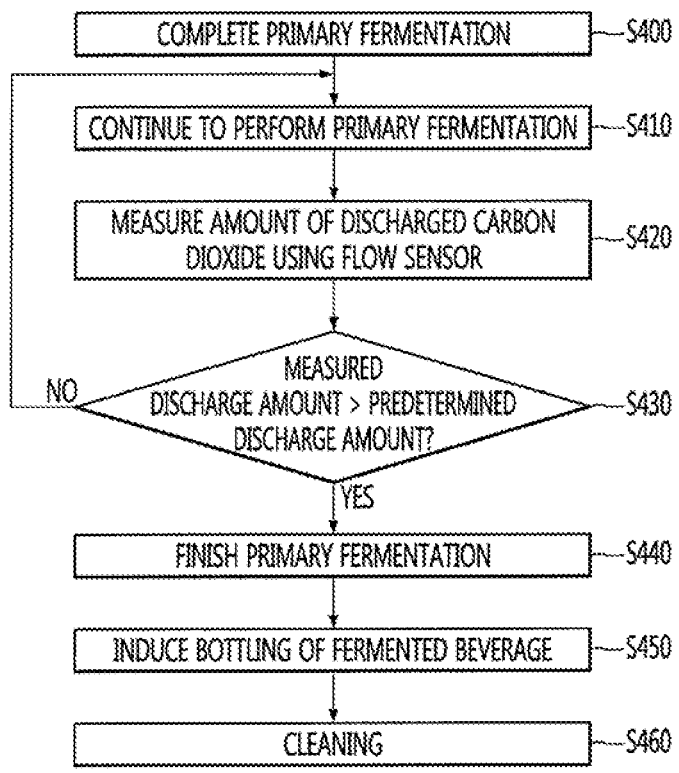
FIG. 4 is a flowchart of a control operation of the beverage maker according to an embodiment.

FIG. 4 is a flowchart of a control operation of the beverage maker according to an embodiment.

The operations (S100 to S160) of FIG. 2 are equally applicable to the embodiment of FIG. 4. Meanwhile, unlike the embodiment of FIG. 2, in the embodiment of FIG. 4, the secondary fermentation operation (S170) to the beverage dispensing operation (S190) may not be performed in the beverage maker.

Referring to FIG. 4, the beverage maker may continue to perform the primary fermentation operation (S410), when the primary fermentation operation is complete (S400). The controller 450 may close the gas discharge valve 73, after opening the gas discharge valve 73 during a predetermined opening time while the primary fermentation operation is performed. The controller 450 may sense a pressure change using the gas pressure sensor 72 while the gas discharge valve 73 is closed. The controller 450 may determine that the primary fermentation operation is completed when the detected pressure change is equal to or less than a primary fermentation reference pressure change.

Upon determining that the primary fermentation operation is completed, the beverage maker may further perform the primary fermentation operation. That is, the controller 450 may open the gas discharge valve 73 to open the gas discharge channel 71 in the same manner as the primary fermentation operation performed previously. The controller 450 may continuously open the gas discharge valve 73, without repeatedly opening/closing the gas discharge valve 73 as in the primary fermentation operation (S160) performed previously.

As the primary fermentation operation is completed, carbonic acid (carbon dioxide) which is being fermented may be generated in the operation (S420). The generated carbon dioxide may be discharged via the gas discharge channel 71.

The beverage maker may measure the amount of carbon dioxide generated from the beverage, which is being made, using the flow sensor 78 provided in the gas discharge channel 71, while the primary fermentation operation is further performed. The controller 450 may sense the flow rate of carbon dioxide discharged to the outside via the gas discharge channel 71, by controlling the flow sensor 78 during the operation (S410). The flow rate may correspond to the amount of fluid during the unit time. The flow sensor 78 may periodically or continuously sense the flow rate under control of the controller 450.

The controller 450 may measure the amount of discharged carbon dioxide while the primary fermentation operation is further performed, based on the flow rate sensed by the flow sensor 78. More specifically, the controller 450 may measure (calculate) the amount of discharged carbon dioxide, by accumulating the flow rate periodically or continuously sensed by the flow sensor 78.

The controller 450 may compare the measured amount of discharged carbon dioxide with a predetermined discharge amount (reference discharge amount). The reference discharge amount may correspond to a difference between a total amount of carbon dioxide generated from the beverage and an amount of carbon dioxide (carbonic acid) dissolved in the finished beverage.

The total amount of generated carbon dioxide may be calculated based on type, for example, the type of wort and yeast of ingredients introduced when making the beverage and the amount (weight) of the fermented beverage. For example, the total amount of generated carbon dioxide may be proportional to the amount of beverage.

The memory 440 may store information on the total amount of generated carbon dioxide, which is calculated in advance in correspondence with the type of beverage to be made. Alternatively, the memory 440 may store an algorithm for calculating the total amount of generated carbon dioxide based on the type of the ingredient and the amount of beverage.

The amount of carbonic acid may be calculated based on the type of beverage to be made and the amount of beverage. For example, the memory 440 may store information on a reference amount of carbonic acid corresponding to the type of beverage to be made. The reference amount of carbonic acid may mean the amount of carbon dioxide dissolved in a predetermined reference amount of beverage. Therefore, the controller 450 may calculate the amount of carbonic acid in the beverage to be made, based on the amount of beverage to be made and the reference amount of carbonic acid.

When the amount of beverage made in the beverage maker is fixed, the memory 440 may store information on the total amount of generated carbon dioxide and the amount of carbonic acid for each beverage type. When the measured discharge amount is less than the predetermined discharge amount (NO of S430), the beverage maker may continuously perform the operations (S410 to S420). When the measured discharge amount reaches or exceeds the predetermined discharge amount (YES of S430), the beverage maker may finish the primary fermentation operation which is being further performed (S440).

The controller 450 may finish the primary fermentation operation performed further when the measured discharge amount reaches or exceeds the predetermined discharge amount (the reference discharge amount). That is, the controller 450 may close the gas discharge valve 73, thereby preventing carbon dioxide from being discharged to the outside.

In this case, all sugar ingredients (included in wort) present in the beverage which is being made may not be exhausted. Accordingly, as the fermentation operation using the sugar ingredients may be performed during the secondary fermentation operation after bottling of the beverage, it is unnecessary to additionally introduce sugar and forcibly introduce carbon dioxide.

After the primary fermentation operation which is being further performed is completed, the beverage maker may induce bottling of the fermented beverage (S450). The controller 450 may induce the beverage accommodated in the fermentation module 1 to be dispensed to an external container, for example, a pressure vessel, in order to perform secondary fermentation (carbonization) outside of the beverage maker.

For example, the controller 450 may output a bottling guide to induce the beverage to be dispensed to the external container via the output interface 430. The user may operate the dispenser 62 based on the output bottling guide and dispense the beverage accommodated in the fermentation module 1 to the outside according to operation of the dispenser 62. When dispensing of the beverage is completed, the user may operate the dispenser 62 again.

After bottling is completed, the controller 450 may further output a guide including a time required to complete the secondary fermentation operation and the aging operation of the beverage and a management method of the bottled beverage via the output interface 430. In some embodiments, after bottling of the beverage is completed, the beverage maker may perform the cleaning operation (S460). The cleaning operation (S460) may be substantially the same as the cleaning operation (S200) after the beverage is dispensed, which is shown in FIG. 2.

That is, unlike the embodiment of FIG. 2, according to the embodiment shown in FIG. 4, as the secondary fermentation operation and the aging operation are performed outside of the beverage maker, it is possible to efficiently shorten the time of the beverage making operation performed in the beverage maker. Accordingly, the user may make a larger amount of beverage using the beverage maker in a same amount of time.

FIGS. 5 to 10 are views illustrating examples of a control operation of a beverage maker according to the embodiment shown in FIG. 4.

Figure 5:
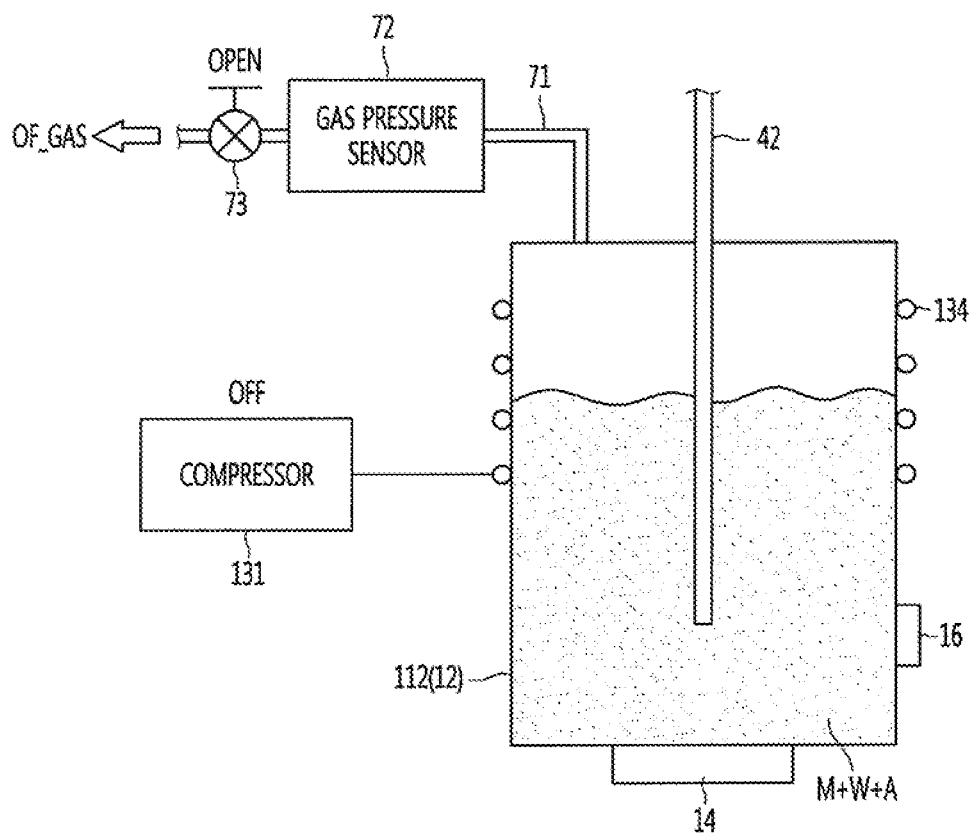
FIGS. 5 to 10 are views illustrating examples of the control operation of the beverage maker according to the embodiment shown in FIG. 4.

FIG. 5 is a view related to the primary fermentation operation performed by the beverage maker. Referring to FIG. 5, the controller 450 may open the gas discharge valve 73 to open the gas discharge channel 71.

As the gas discharge channel 71 is opened, gas OF_GAS including off-flavor generated from a mixture M+W+A of malt, water, and an additive accommodated in the fermentation tank 112 or the fermentation container 12 may be discharged to the outside via the gas discharge channel 71. For example, the additive A may include hop, yeast, and a flavor additive. The gas OF_GAS may correspond to gas generated at the time of yeast fermentation. The controller 450 may open the gas discharge channel 71 during a first opening time based on recipe information.

The controller 450 may turn off compressor 131. However, while the primary fermentation operation is performed, temperatures of the fermentation tank 112 and the mixture M+W+A may vary according to the external environment. The controller 450 may periodically measure a temperature using the temperature sensor 16 and drive the compressor 131 or the heater 14 when the measured temperature is different from a primary fermentation target temperature by more than a predetermined value. For example, when the measured temperature is lower than the primary fermentation target temperature, for example, 20° C., by more than a predetermined value, for example, 2° C., the controller 450 may drive the heater 14 to heat the fermentation tank 112 and the mixture M+W+A. In contrast, when the measured temperature is higher than the primary fermentation target temperature by more than the predetermined value, the controller 450 may drive the compressor 131 to cool the fermentation tank 112 and the mixture M+W+A.

Figure 6:
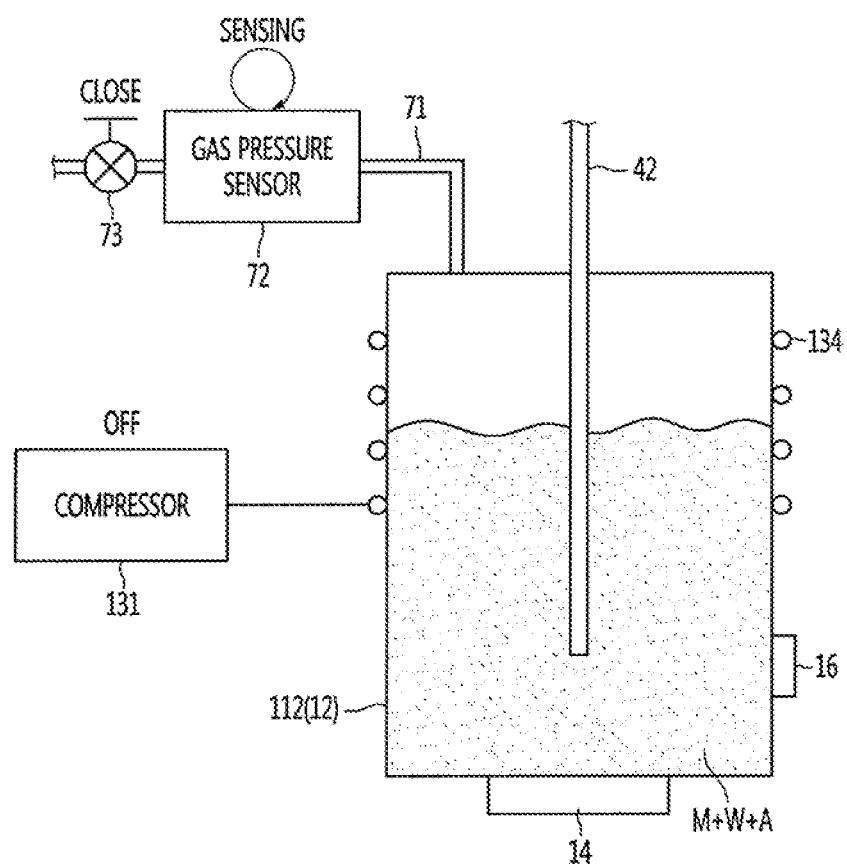

FIG. 6 is a view illustrating an operation of determining whether the beverage maker completes the primary fermentation operation. Referring to FIG. 6, the controller 450 may close the gas discharge valve 73 to close the gas discharge channel 71, after the first opening time has elapsed.

As the gas discharge channel 71 is closed, as gas generated from the mixture M+W+A is not discharged from the fermentation tank 112 or the fermentation container 12, the inner pressure of the fermentation tank 112 or the fermentation container 12 may gradually increase. The controller 450 may sense pressure using the gas pressure sensor 72 while the gas discharge channel 71 is closed during a closing time based on recipe information. For example, the controller 450 may sense a first pressure immediately after the gas discharge channel 71 is closed and sense a second pressure when the closing time has elapsed.

When a difference between the first pressure and the second pressure exceeds a primary fermentation reference pressure change, the controller 450 may determine that primary fermentation is not complete. The controller 450 may open the gas discharge channel 71 during a second opening time set based on recipe information, continuously performing primary fermentation. Such operation may be substantially equal to the operation of FIG. 5.

After the second opening time has elapsed, the controller 450 may sense pressure using the gas pressure sensor 72 while closing the gas discharge channel 71 during the closing time based on the recipe information. That is, the controller 450 may repeatedly perform a control operation according to the embodiments of FIGS. 5 and 6 until the difference between the first pressure and the second pressure becomes equal to or less than the primary fermentation reference pressure change. In some embodiments, the controller 450 may repeatedly perform the control operation according to the embodiments of FIGS. 5 and 6 until it is continuously determined that the difference between the first pressure and the second pressure is equal to or less than the primary fermentation reference pressure change a predetermined number of times.

The controller 450 may complete primary fermentation when the difference between the first pressure and the second pressure is equal to or less than the primary fermentation reference pressure change set based on recipe information. This may correspond to the operation (S400) of FIG. 4.

Figure 7:
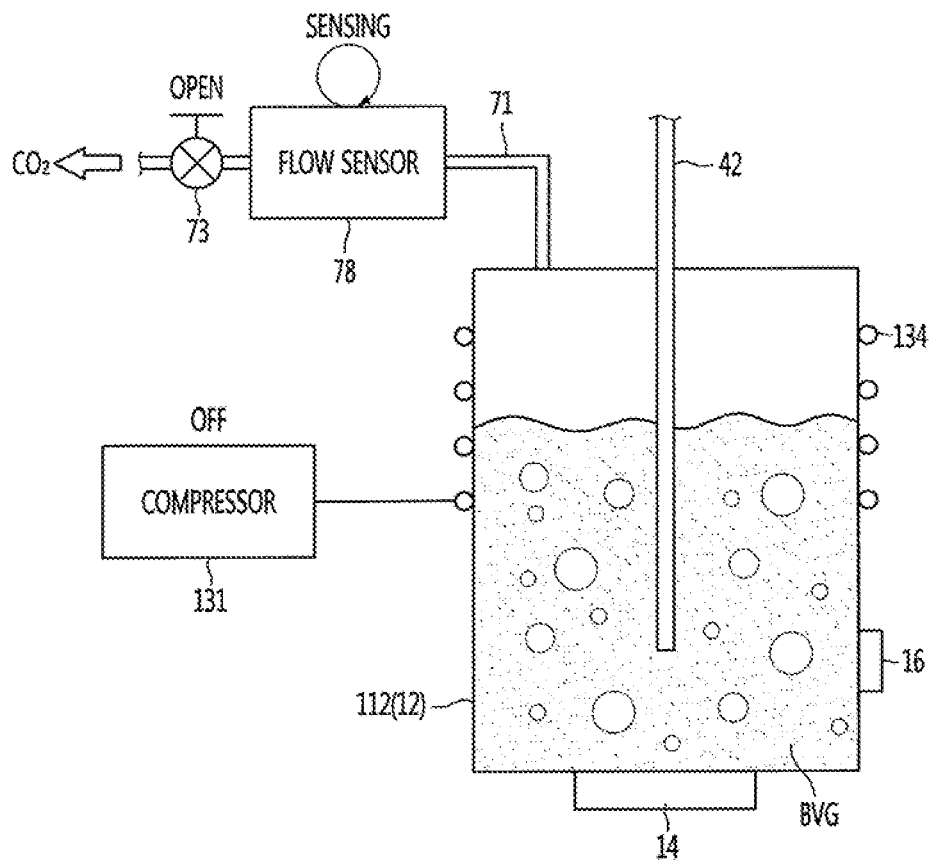

FIG. 7 is a view showing an operation in which the beverage maker further performs the primary fermentation operation according to the operation (S410) of FIG. 4. Referring to FIG. 7, the controller 450 may open the gas discharge valve 73 to open the gas discharge channel 71, in order to further perform the primary fermentation operation.

As the gas discharge channel 71 is opened, some carbon dioxide generated from beverage BVG may be discharged to the outside via the gas discharge channel 71. While carbon dioxide is discharged, the flow sensor 78 may periodically or continuously sense a flow rate.

The controller 450 may cumulatively measure the amount of discharged carbon dioxide based on the flow rate periodically or continuously sensed by the flow sensor 78. When the amount of discharged carbon dioxide reaches the reference discharge amount or exceeds the reference discharge amount, the controller 450 may complete the primary fermentation operation performed further. Therefore, the controller 450 may close the gas discharge valve 73 to close the gas discharge channel 71.

Figure 8:

FIG. 8 is a view illustrating a bottling guide output by the beverage maker. Referring to FIG. 8, when the primary fermentation operation performed further is completed, the controller 450 may output a bottling guide 800 via the display 432. For example, the bottling guide 800 may be output via the display 432 in the form of text, without being limited thereto, and may be output in the form of graphics, for example. In addition, the bottling guide 800 may be output via the speaker 434 in the form of voice or sound.

In some embodiments, the controller 450 may transmit a notification corresponding to the bottling guide to a terminal of a user via the communication interface 410. Therefore, the user may conveniently confirm the bottling guide at a position separated from the beverage maker.

Figure 9:
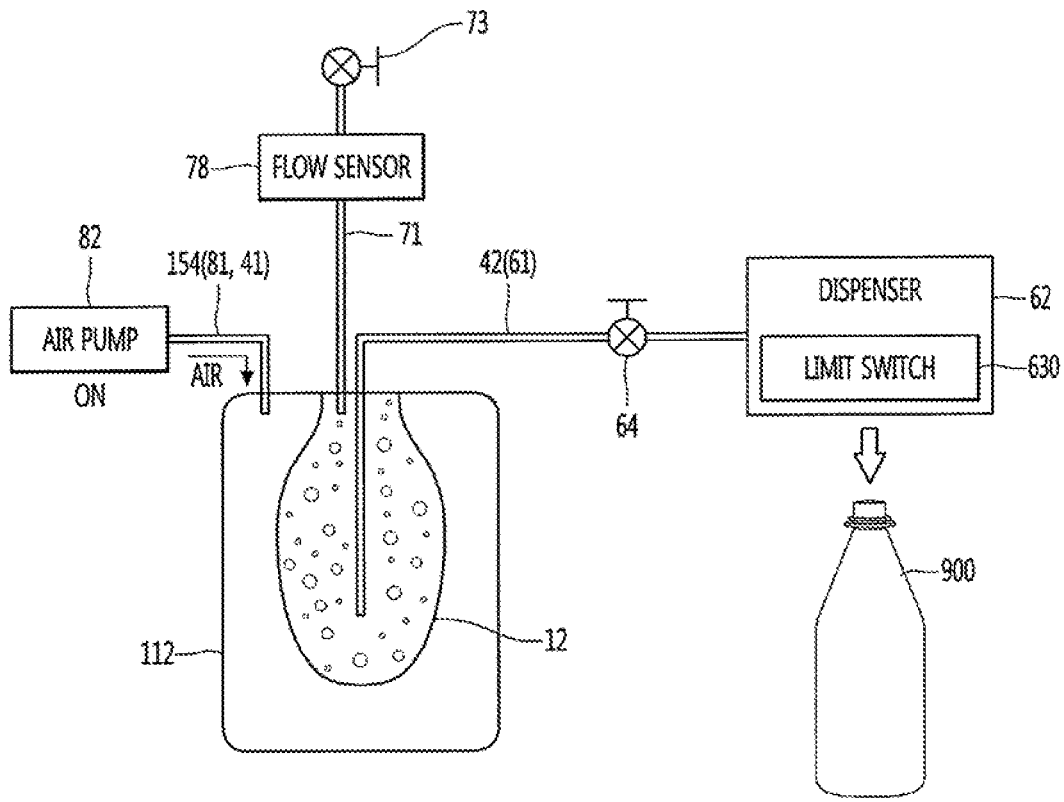

FIG. 9 is a view illustrating an operation in which beverage is dispensed for bottling of the beverage accommodated in the fermentation tank 112 (or the fermentation container 12). As the user confirms the output bottling guide 800, a container, for example, a pressure container, in which the beverage accommodated in the fermentation module 1 will be contained may be placed at the outlet and the dispenser 62 may be operated to dispense the beverage to the outside.

When a limit switch 630 is turned on as the user opens the dispenser 62, the controller 450 may open the beverage dispensing valve 64. As the beverage dispensing valve 64 is opened, the beverage in the fermentation container 12 may be dispensed to the outside via the dispenser 62, by passing through channels 42 and 61 between the fermentation module 1 and the dispenser 62.

As the beverage in the fermentation container 12 is dispensed to the outside, the inner pressure of the fermentation container 12 may decrease, such that the beverage may not be smoothly dispensed. Therefore, the controller 450 may drive the air pump 82, and air pumped by the air pump 82 may be guided between the outer surface of the fermentation container 12 and the inner wall of the fermentation tank 112 via the air supply channel 154. The guided air may pressurize the fermentation container 12, thereby solving a problem that the beverage is not smoothly dispensed as the inner pressure of the fermentation container 12 decreases.

Figure 10:

FIG. 10 is a view illustrating an example of a making guide provided by a beverage maker after a bottling operation is completed. After the beverage accommodated in the fermentation container 12 is bottled into the external container, as shown in FIG. 9, the controller 450 may output a making guide 1000 for correct secondary fermentation and aging of the beverage accommodated in the external container. For example, the making guide 1000 may be output via the display 432 in the form of text or in various forms (in the form of graphics or in the form of voice or sound via the speaker 434), as described above in FIG. 8. In addition, the controller 450 may transmit a notification corresponding to the making guide 1000 to the terminal of the user via the communication interface 410.

The user may store the container in which the beverage is accommodated based on the provided making guide 1000, and drink the finished beverage. In addition, the user may start to make a new beverage using the beverage maker while secondary fermentation and aging of the beverage accommodated in the external container.

According to embodiments disclosed herein, the beverage maker may measure an amount of carbon dioxide discharged via the gas discharge channel after primary fermentation is completed and sense a bottling time point of the beverage to induce bottling, thereby enabling carbonation by remaining sugar ingredients in the bottled beverage. Accordingly, it is possible to improve user convenience, by removing inconvenient processes, such as introduction of sugar for carbonation or forcible introduction of carbon dioxide.

In addition, the beverage maker may set an amount of carbonic acid in a final beverage, via a difference between the total amount of generated carbon dioxide and a measured amount of discharged carbon dioxide of the beverage which is being made. Accordingly, the beverage maker may more accurately set the amount of carbonic acid in the final beverage, thereby ensuring quality improvement and uniformity of beverage and maximizing user satisfaction.

Embodiments disclosed herein provide a beverage maker for performing control to bottle a beverage to the outside for carbonation of beverage subjected to primary fermentation without injection of sugar for generating carbonic acid or forcible injection of carbon dioxide. A beverage maker according to an embodiment may further perform a primary fermentation operation when completion of the primary fermentation operation is confirmed while a beverage is being made, acquire an amount of discharged carbon dioxide using a flow sensor while the primary fermentation operation is further performed, and induce bottling of the beverage which is being made.

The beverage maker may close a gas discharge valve and induce bottling when a measured amount of discharged carbon dioxide reaches or exceeds a reference discharge amount, thereby forming a predetermined amount of carbonic acid in the bottled beverage. The beverage maker may output a bottling guide inducing bottling of the beverage when the measured amount of discharged carbon dioxide reaches or exceeds the reference discharge amount, thereby inducing bottling operation of a user. The beverage maker may open a beverage dispensing valve as a dispenser is operated based on the output bottling guide, thereby dispensing the beverage in the fermentation tank to the outside.

The beverage maker may supply air between an outer surface of a fermentation container, in which the beverage is received, and an inner wall of a fermentation tank, in which the fermentation container is received, while the beverage is dispensed. Therefore, it is possible to prevent a dispensing speed of the beverage from decreasing due to a decrease in inner pressure of the fermentation container. The beverage maker may output a making guide related to a residual making operation of a beverage bottled into the external container after the beverage is dispensed, thereby inducing the beverage to be efficiently made.

The beverage maker may transmit a notification corresponding to a bottling guide to a terminal of a user via a communication interface, thereby allowing the user separated from the beverage maker to confirm a bottling time point.

Details of one or more embodiments are set forth in the accompanying drawings and the description. Other features will be apparent from the description and drawings, and from the claims. The disclosed subject matter is to be considered illustrative, and not restrictive, and the appended claims are intended to cover all such modifications, enhancements, and other implementations, which fall within the scope. Thus, implementation of embodiments is to be considered illustrative, and not restrictive. Therefore, the scope is defined not by the detailed description but by the appended claims, and all differences within the scope will be construed as being included.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage maker, comprising:
a fermentation tank forming a space in which a beverage is made;
a gas discharge channel connected to an inside of the fermentation tank;
a gas discharge valve disposed in the gas discharge channel;
a gas pressure sensor disposed in the gas discharge channel;
a flow sensor disposed in the gas discharge channel; and
a controller configured to control a primary fermentation operation of the beverage to be made, wherein the controller is configured to:
open or close the gas discharge valve during the primary fermentation operation, sense a pressure detected by the gas pressure sensor while the gas discharge valve is closed, and confirm the primary fermentation operation to be complete, when a detected pressure change is equal to or less than a primary fermentation reference pressure change;
further perform the primary fermentation operation by opening the gas discharge valve, when completion of the primary fermentation operation is confirmed;
acquire information on an amount of carbon dioxide discharged via the gas discharge channel using the flow sensor while the primary fermentation operation is further performed; and
perform a bottling inducing operation for bottling of the beverage, which is being made, into an external container, based on the amount of discharged carbon dioxide.

2. The beverage maker of claim 1, wherein the controller performs the bottling inducing operation when the amount of discharged carbon dioxide reaches or exceeds a reference discharge amount.

3. The beverage maker of claim 1, wherein the controller closes the gas discharge valve when the amount of discharged carbon dioxide reaches or exceeds a reference discharge amount.

4. The beverage maker of claim 1, wherein the controller calculates the amount of discharged carbon dioxide based on a flow rate periodically or continuously sensed by the flow sensor while the primary fermentation operation is further performed.

5. The beverage maker of claim 1, further comprising an output interface including at least one of a display or a speaker, wherein the controller outputs, via the output interface, a bottling guide inducing bottling of the beverage, when the amount of discharged carbon dioxide reaches or exceeds a reference discharge amount.

6. The beverage maker of claim 5, further comprising:
a dispenser configured to dispense the beverage;
a beverage dispensing channel connected between the inside of the fermentation tank and the dispenser; and
a beverage dispensing valve disposed in the beverage dispensing channel, wherein the controller opens the beverage dispensing valve as the dispenser is operated based on the output bottling guide.

7. The beverage maker of claim 6, further comprising:
a fermentation container forming an accommodation space in which the beverage which is being made is accommodated;
an air pump configured to inject air; and
an air supply channel connected between a space between an outer surface of the fermentation container and an inner wall of the fermentation tank and the air pump, wherein the controller drives the air pump to supply air into the space between the outer surface of the fermentation container and the inner wall of the fermentation tank, while beverage is dispensed as the beverage dispensing valve is opened.

8. The beverage maker of claim 6, wherein the controller outputs, via the output interface, a making guide related to a residual making operation of beverage bottled into the external container, after the beverage is dispensed.

9. The beverage maker of claim 5, further comprising a communication interface configured to be connected to a terminal of a user, wherein the controller transmits a notification corresponding to the bottling guide to the terminal via the communication interface.

10. A method for controlling a beverage maker including a fermentation tank forming a space in which a beverage is made, a gas discharge channel connected to an inside of the fermentation tank, a gas pressure sensor disposed in the gas discharge channel, a flow sensor disposed in the gas discharge channel, and a controller configured to perform a control operation for making the beverage, the method comprising:
opening or closing the gas discharge valve during a primary fermentation operation, sensing a pressure detected by the gas pressure sensor while the gas discharge valve is closed, and confirming, by the controller, completion of the primary fermentation operation while the beverage is made, when a detected pressure change is equal to or less than a primary fermentation reference pressure change;
further performing the primary fermentation operation by opening a gas discharge valve disposed in the gas discharge channel, when completion of the primary fermentation operation is confirmed;
acquiring, by the controller, information on an amount of carbon dioxide discharged via the gas discharge channel using a flow sensor disposed in the gas discharge channel, while the primary fermentation operation is further performed; and
performing a bottling inducing operation for bottling of the beverage, which is being made, into an external container based on the amount of discharged carbon dioxide.

11. The method of claim 10, wherein the performing of the bottling inducing operation is performed when the amount of discharged carbon dioxide reaches or exceeds a reference discharge amount.

12. The method of claim 11, further comprising closing the gas discharge valve when the amount of discharged carbon dioxide reaches or exceeds the reference discharge amount.

13. The method of claim 10, wherein the acquiring of the information on the amount of discharged carbon dioxide includes calculating the amount of discharged carbon dioxide based on a flow rate periodically or continuously sensed by the flow sensor while the primary fermentation operation is further performed.

14. The method of claim 10, further comprising outputting, via at least one of a display or a speaker, a bottling guide for inducing bottling of the beverage, when the amount of discharged carbon dioxide reaches or exceeds a reference discharge amount.

15. The method of claim 14, wherein the performing of the bottling inducing operation includes opening a beverage dispensing valve disposed in the beverage dispensing channel, when a dispenser connected to the inside of the fermentation tank via a beverage dispensing channel is operated based on the bottling guide.

16. The method of claim 15, further comprising outputting a making guide related to a residual making operation of the beverage bottled into the external container via at least one of the display or the speaker, after the beverage is dispensed.

17. The method of claim 14, further comprising transmitting a notification corresponding to the bottling guide to a terminal of a user via a communication interface.

18. A beverage maker, comprising:
a fermentation tank forming a space in which a beverage is made;
a gas discharge channel connected to an inside of the fermentation tank;
a gas discharge valve disposed in the gas discharge channel;
a gas pressure sensor disposed in the gas discharge channel;
a flow sensor disposed in the gas discharge channel; and
a controller configured to control a primary fermentation operation of the beverage to be made, wherein the controller is configured to:
open or close the gas discharge valve during the primary fermentation operation, sense a pressure detected by the gas pressure sensor while the gas discharge valve is closed, and confirm the primary fermentation operation to be complete, when a detected pressure change is equal to or less than a primary fermentation reference pressure change;
further perform the primary fermentation operation by opening the gas discharge valve, when completion of the primary fermentation operation is confirmed;
compare an amount of carbon dioxide discharged via the gas discharge channel sensed by the flow sensor while the primary fermentation operation is further performed to a reference discharge amount; and
perform a bottling inducing operation for bottling of the beverage, which is being made, into an external container when the amount of discharged carbon dioxide reaches or exceeds the reference discharge amount.

19. The beverage maker of claim 18, wherein the controller closes the gas discharge valve when the amount of discharged carbon dioxide reaches or exceeds the reference discharge amount.

20. The beverage maker of claim 18, wherein the controller calculates the amount of discharged carbon dioxide based on a flow rate periodically or continuously sensed by the flow sensor while the primary fermentation operation is further performed.

* * * * *